Figure 1:
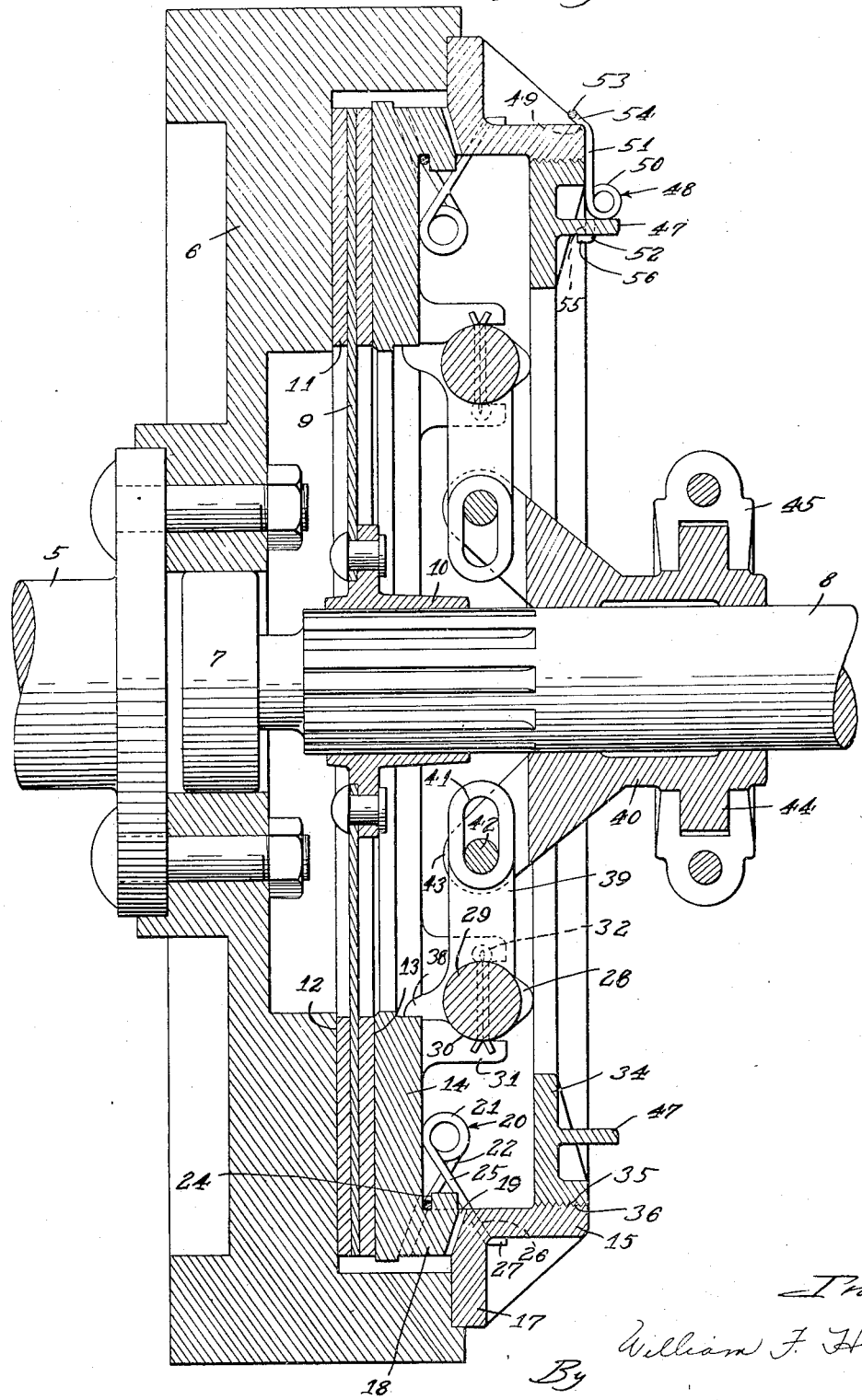

Aug. 8, 1933.  W. F. HUGHES  1,921,315

CLUTCH

Filed Sept. 21, 1931  2 Sheets-Sheet 1

Inventor.
William F. Hughes
By
Wilson, Dowell, McCanna & Rehm
Attys.

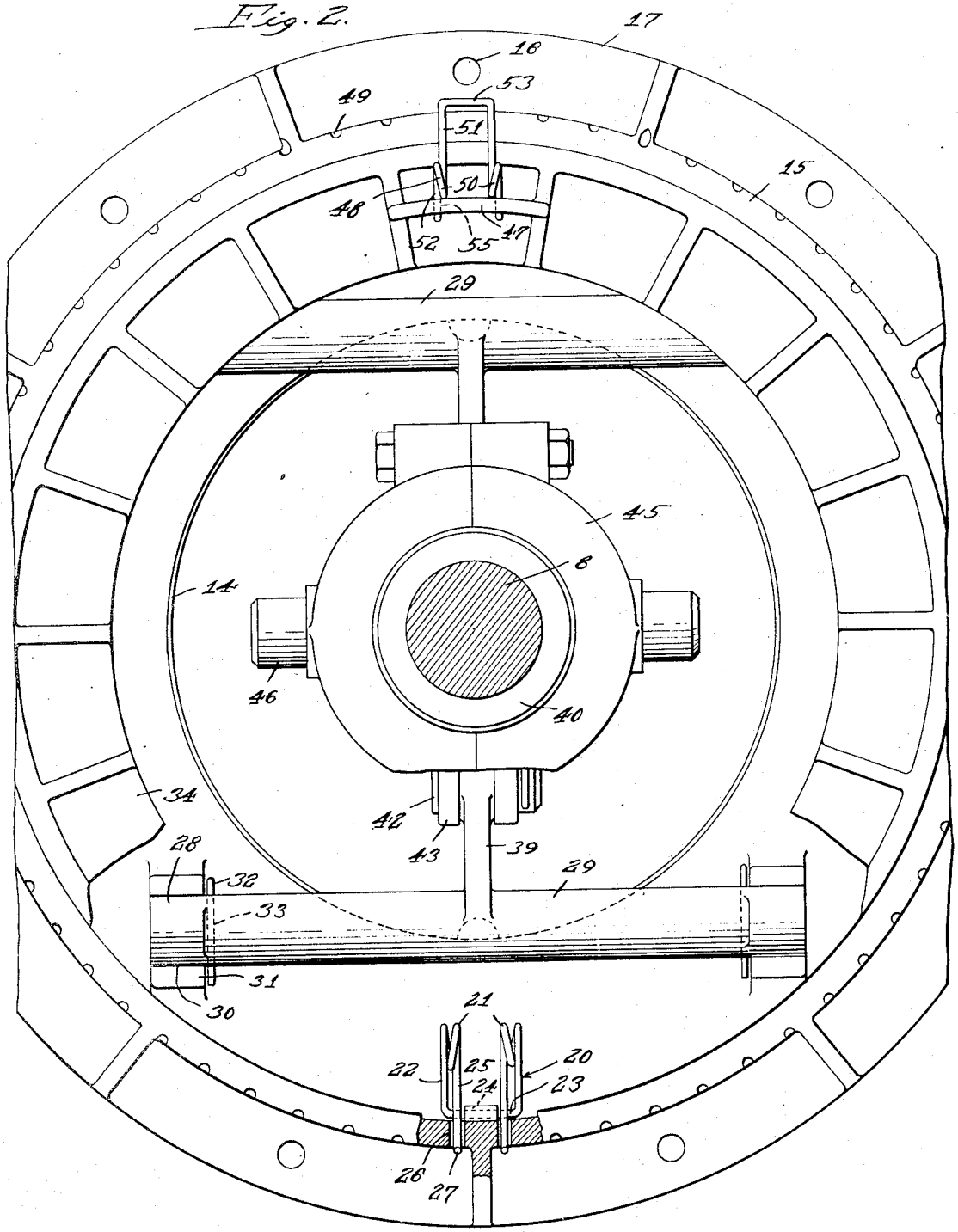

Patented Aug. 8, 1933

1,921,315

UNITED STATES PATENT OFFICE 1,921,315

CLUTCH

William F. Hughes, Rockford, Ill., assignor to Rockford Drilling Machine Co., Rockford, Ill., a Corporation of Illinois Application September 21, 1931
Serial No. 564,099

13 Claims. (Cl. 192—68)

This invention relates to friction clutches generally, but more particularly an overcenter type of clutch especially adapted for use on tractors, or for any similar heavy duty purpose.

My invention has for its principal object improvements in the design and construction of a clutch of this kind with a view to economy and easy assembling, as well as greater serviceability, ease and accuracy in adjustment, and generally improved performance.

This clutch, in accordance with one phase of my invention, has an extremely simple form of cam means for effecting positive engagement of the clutch, and spring means also of simple form tending normally to disengage the clutch whereby to relieve the clutch of any tendency for drag when the cam means is operated for disengagement of the clutch.

According to another phase of my invention, I provide a ring constituting the abutment for the cams and threaded in the back plate for adjustment whereby a single adjustment accurately determines the engagement of the clutch by the cams at all points circumferentially of the clutch disc, and also provide in connection with this ring a single means for locking the ring to the back plate in any position of adjustment.

The invention is illustrated in the accompanying drawings, in which—

Figure 1 is a longitudinal section in a vertical plane of a clutch made in accordance with my invention, the same being shown engaged, and Fig. 2 is a rear view of Figure 1 with portions broken away for purposes of better illustration.

The same reference numerals are applied to corresponding parts in the two views.

The end portion of the crank shaft of the engine appears at 5 in Figure 1, and has the flywheel 6 mounted thereon as shown. A pilot bearing 7 at the center of the flywheel supports the front end of the driven shaft 8 which extends rearwardly from the flywheel and clutch into the gear box of the transmission in the usual way. 9 is the clutch disc, the center hub 10 of which is splined on the front end of the shaft 8 to transmit drive from the flywheel to the shaft when the clutch is engaged. The usual pads or facings 11 are provided on the marginal portion of the disc on opposite sides thereof for engagement with the driving face 12 on the back of the flywheel and the driving face 13 on the front of the pressure plate 14. The latter is suitably cast like the flywheel, and the faces 12 and 13 are accurately machined on these parts for smooth engagement of the clutch. The back plate 15 is also preferably cast and is fastened to the rim of the flywheel by bolts entered through the holes 16 in the flanged marginal portion 17 thereof.

The pressure plate 14 has a plurality of equally circumferentially spaced lugs 18 suitably cast integral therewith and projecting rearwardly therefrom. These lugs have the side faces thereof machined smooth for sliding reception in guides 19 provided on the front of the back plate 15, whereby to make the pressure plate turn with the flywheel but allow for movement of said plate toward and away from the driving face 12 for engagement and disengagement of the clutch. Torsion springs 20 are provided for normally urging the pressure plate 14 away from the flywheel for disengagement of the clutch so that when the cams hereinafter described are operated for disengagement of the clutch, the springs 20 retract the pressure plate and allow the flywheel to turn independently of the clutch disc. This retracting movement of the pressure plate is limited by the back plate at 18—19 in a manner thought to be self-evident. The springs 20 are of a double-coiled torsion type frequently referred to as grasshopper springs, the two coils 21 as best appears in Fig. 2 having radiating arms 22 interconnected by a cross-portion 23 entered in a recess 24 provided on the lug 18 of the pressure plate, for connection of the springs with the pressure plate on the one hand, and the coils 21 having other radiating arms 25 passed through holes 26 provided in the back plate 15 with the free ends 27 bent as shown in Fig. 1 so as to connect the springs with the back plate 15 on the other hand. The arms 22 and 25 are under tension due to the coils 21 so that when the pressure plate 14 is free to do so, the springs retract the plate with respect to the flywheel. In the engagement of the clutch in the manner hereinafter described, the pressure plate is moved positively toward the flywheel to grip the marginal padded portion 11 of the clutch disc 9 between the faces 12 and 13 and, of course, this movement of the pressure plate spreads the arms 22 and 25 of the springs 20, thereby increasing the torsional tension in the coils 21 of these springs to insure immediate disengagement of the clutch when the cams are subsequently operated for disengagement of the clutch.

The positive engagement of the clutch is secured by the simultaneous, like operation of four cams 28 disposed at equally circumferentially spaced points with respect to the pressure plate 14. These cams are provided on the opposite ends of two parallel shafts 29 disposed in a plane at right angles to the shaft 8 and equally spaced on either side thereof, as clearly appears in Fig. 2. The shafts 29 have their ends received with a close working fit in bearings 30 formed as open recesses in lugs 31 suitably cast integral with and projecting from the back of the pressure plate. The cams 28 are suitably formed integral with the shafts 29 and constitute only slight projections on the ends of the shafts as appears in Figure 1. The shafts are arranged to have such a small amount of oscillatory movement as hereinafter appears that the cams 28 do not interfere with the oscillation of said shafts in the bearings 30. Cotter pins 32 are entered in holes 33 in the ends of the shafts 29 and serve by abutment with the lugs 31 to hold the shafts against endwise movement in the bearings 30. Now, a ring 34 is externally threaded as at 35 to thread in the internally threaded portion 36 of the back plate 15, and provides a flat inner face for abutment with the cams 28. When the shafts 29 are turned to bring the noses of the cams in abutment with the inner face of the plate 34, as appears in Figure 1, the clutch is positively engaged, the padded marginal portion 11 of the disc 9 being firmly clamped between the faces 12 and 13. I prefer to arrange for the turning of the cams 28 slightly past dead center so that there will be no danger of the cams allowing the clutch to become disengaged. It is from this feature that the clutch derives its name as an overcenter type of clutch. Lugs 38 are provided on the shafts 29 at the middle thereof for engagement with the inner edge of the pressure plate 14 to limit the turning of the shafts and prevent the cams 28 from being turned past the position illustrated in Figure 1. Levers 39 are also provided on the shafts 29 at the middle thereof and substantially at right angles to the lugs 38 and projecting substantially radially inwardly relative to the shafts 8 for connection with a throw-out collar 40 mounted on said shaft. The inner ends of the levers 39 are slotted as at 41 to slidably receive pins 42 mounted in forks 43 projecting forwardly from and suitably formed integral with the collar 40. The collar 40 is slidable on the shaft 8 and has an annuar flange 44 over which a two-piece ring 45 fits to provide connection between the throw-out collar 40 and the usual yoke or other suitable clutch operating means cooperating with the trunnions 46 on the ring.

In operation, when the throw-out collar 40 is moved forwardly, the levers 39 turn the shafts 29 and, hence, the cams 28 to positively engage the clutch as the cams ride on the inner face of the ring 34. When the cams are on dead center, it is obvious that the padded marginal portion 11 of the clutch disc 9 is firmly clamped between the driving faces 12 and 13 of the flywheel and pressure plate, respectively. Very slight additional angular movement of the cams overcenter results in the engagement of the lugs 38 with the inner periphery of the pressure plate. In this slight additional movement there is, of course, a slight relaxing of pressure on the clutch disc, but only to an infinitesimal extent and not enough to affect the transmission of power from the flywheel to the clutch disc, the pads 11 being compressible to such an extent that the cams can be turned overcenter in the manner described and still hold the clutch positively engaged. It is manifest that there is considerable pressure brought to bear by the cams against the flat face of the ring 34 by reason of the compression of the pads 11 and the deflection of the springs 20 and, of course, when the cams have been moved overcenter as just described, this pressure tends to keep the cams in that position and prevent accidental disengagement of the clutch. In other words, it requires an appreciable force exerted on the throw-out collar 40 to release the clutch once the same has been engaged. On the other hand, after the clutch has been disengaged, the springs 20 hold the pressure plate in retracted position, and it takes an appreciable force to overcome the action of these springs to engage the clutch. The clutch is, therefore, actually held disengaged under the pressure of the same springs 20 that otherwise serve to hold the clutch engaged, or at least resist its disengagement. This feature is of considerable advantage on a tractor because the operator can make an adjustment of the implement being drawn by the tractor without keeping his foot on the clutch pedal or otherwise holding the clutch disengaged. Frequently, serious accidents result when the operator accidentally releases his hold on the clutch pedal while some change is being made on the implement. The clutch is obviously of simple and inexpensive construction and can be installed quickly and easily.

The ring 34 providing the abutment face for the cams 28, is arranged to be turned relative to the back plate 15 to adjust the clutch so that positive engagement can be secured regardless of wear of the pads 11 in service. It is obvious that since the ring has the same relation to all of the cams 28 which engage the same at four equally circumferentially spaced points thereon, and the ring is threaded as at 35—36 for adjustment relative to the back plate, any adjustment of the ring will mean exactly the same adjustment of the inner face with respect to each and every cam. The advantage of such a single adjustment which at the same time so accurately determines the engagement of the clutch by the cams at all points circumferentially of the clutch disc can be easily appreciated. While it is evident that the nature of the clutch adjustment is such that there is little danger of the ring 34 turning and throwing the clutch out of adjustment, I prefer to provide a lock therefor, preferably a single lock. Thus, a rearwardly projecting lug 47 is provided on the ring 34 to serve as a mounting for a double-coiled torsion spring 48 arranged to have locking engagement with the back plate 15 in notches 49 provided in the latter. The spring 48 is similar to the springs 20, the same having a pair of coils 50 from which arms 51 extend in one direction and other arms 52 in the other direction. The arms 51 are interconnected as at 53 by a cross-portion and are bent as at 54 (see Figure 1) to enter the notches 49. The arms 52 extend through holes 55 provided in the lug 47 and have their projecting ends bent, as indicated at 56 in Figure 1, to secure the spring in place on the lug. In adjusting the clutch, the spring 48 is disengaged from the notches 49 by deflection of the arms 51 by means of the cross-portion 53 in an obvious manner, and then the ring 34 is turned to bring the same to a position where the desired engagement of the clutch is permitted, whereupon the spring 48 is released for locking engagement in whatever notches 49 happen to be in register or approximate register therewith. It will be observed in Fig. 2 that the notches 49 are spaced the same distance as the arms 51 so that very fine adjustment of the clutch is permitted. The threads at 35—36 will, of course, be provided of such slight pitch that considerable angular movement of the ring is required for a relatively small adjustment of the clutch, and in that way it is obvious that very fine adjustments can be secured. Another lug 47 is, of course, provided on the ring 34 in diametrically opposed relation to the first mentioned lug 47, so as to make for even balance.

It is believed the foregoing description conveys a good understanding of the various objects and advantages of my invention. The appended claims have been drawn with a view to covering all legitimate modifications and adaptations.

I claim:

1. In a friction clutch, the combination with a flywheel constituting the driving element and a clutch disc constituting the driven element, of a back plate turning with the flywheel, a pressure plate, interfitting parts on the back plate and pressure plate for positively turning the pressure plate with the back plate and flywheel and guiding the pressure plate for movement toward and away from the flywheel, spring means at the interfitting parts of said plates normally urging the pressure plate toward the back plate away from the flywheel, and means for moving the pressure plate away from the back plate against the action of said spring means to engage the clutch, said interfitting parts of the back plate and pressure plate being constructed to limit the movement of the pressure plate under the action of the spring means so that the pressure plate moves a predetermined distance away from the flywheel and is uniformly spaced at all points circumferentially thereof with relation to the clutch disc.

2. In a friction clutch, the combination with a flywheel constituting the driving element and a clutch disc constituting the driven element, of a back plate turning with the flywheel, a pressure plate, interfitting portions on the back plate and pressure plate for positively turning the pressure plate with the back plate and flywheel and guiding the pressure plate for movement toward and away from the flywheel, double-coiled torsion springs of the grasshopper type arranged to cooperate with the interfitting portions of the back plate and pressure plate to urge the pressure plate normally toward the back plate away from the flywheel, the said springs each comprising a pair of coils having two pairs of arms radiating therefrom, the one pair of arms being interconnected by a cross-portion, the pressure plate having a recess on its portion for reception of said cross-portion, the back plate having holes in its portion for reception of the free ends of the other arms, whereby to properly relate the spring to the interfitting portions of the pressure plate and back plate, respectively, and means for moving the pressure plate away from the back plate against the action of said spring means to engage the clutch.

3. A clutch as set forth in claim 2 wherein the springs are disposed projecting radially inwardly away from the interfitting portions of the pressure plate and back plate with the coils thereof innermost, whereby the same are urged outwardly under centrifugal action in the operation of the clutch, the recess in the portion of the pressure plate opening inwardly for reception of the cross-portion of the one pair of arms.

4. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch, respectively, a plurality of cams mounted on the pressure plate facing the back plate, a ring threaded on the back plate for adjustment axially relative to the flywheel and pressure plate, the same providing a flat annular face for abutment with said cams, the adjustment of said ring serving to predetermine the movement of the pressure plate for a given operation of the cams, manually operable means for operating the cams to effect positive engagement of the clutch, all of said cams being round nosed and arranged to have sliding engagement with the face of the ring, and means for limiting the turning of the cams whereby the same are substantially on dead center when given extreme movement.

5. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch, respectively, a plurality of cams mounted on the pressure plate facing the back plate, a ring threaded on the back plate for adjustment axially relative to the flywheel and pressure plate, the same providing a flat annular face for abutment with said cams, the adjustment of said ring serving to predetermine the movement of the pressure plate for a given operation of the cams, manually operable means for operating the cams to effect positive engagement of the clutch, all of said cams being round nosed and arranged to have sliding engagement with the face of the ring, and means for limiting the turning of said cams so that the same are moved slightly over center when given extreme movement.

6. In a friction clutch, the combination with a flywheel constituting the driving element and a clutch disc constituting the driven element, of a back plate for the flywheel, a pressure plate guided for movement toward and away from the back plate for disengagement and engagement of the clutch, respectively, a pair of parallel rock shafts supported on the back of the pressure plate for oscillatory movement and disposed the same distance to either side of the axis of rotation, cams on said shafts disposed in substantially equally circumferentially spaced relation with respect to the clutch disc and flywheel, means for simultaneously rocking said shafts to like degrees whereby to correspondingly turn said cams, and an abutment ring threadedly mounted on the back plate for adjustment relative to said cams.

7. A clutch as set forth in claim 6 including means for limiting the rocking of said shafts when the cams thereof are in position for substantially full engagement of the clutch.

8. In a friction clutch, the combination with a flywheel constituting the driving element and a clutch disc constituting the driven element, of a back plate for the flywheel, a pressure plate guided for movement toward and away from the back plate for disengagement and engagement of the clutch, respectively, a pair of parallel rock shafts supported on the back of the pressure plate for oscillatory movement and disposed the same distance to either side of the axis of rotation, cams on said shafts disposed in substantially equally circumferentially spaced relation with respect to the clutch disc and flywheel, means for simultaneously rocking said shafts to like degrees whereby to correspondingly turn said cams, and an abutment ring threadedly mounted on the back plate for adjustment relative to said cams, and means for locking the ring in adjusted position.

9. In a friction clutch, the combination with a flywheel constituting the driving element and a clutch disc constituting the driven element, of a back plate turning with the flywheel, a pressure plate, one or more rearward projections on the pressure plate interfitting with one or more forward projections on the back plate for positively turning the pressure plate with the back plate and flywheel and guiding the pressure plate for movement toward and away from the flywheel, one or more torsion type springs for urging the pressure plate toward the back plate away from the flywheel, said springs each being disposed in radially inwardly spaced relation to the aforesaid interfitting projections between the back plate and pressure plate and having arms normally tending to move in opposite directions and engaged with the back plate and the rearward projectitons of the pressure plate, respectively, whereby normally to urge the pressure plate toward the back plate, and means for moving the pressure plate away from the back plate against the action of said spring means to engage the clutch.

10. In a friction clutch, the combination with a flywheel constituting the driving element and a clutch disc constituting the driven element, of a back plate turning with the flywheel, a pressure plate, one or more rearward projections on the pressure plate interfitting with one or more forward projections on the back plate for positively turning the pressure plate with the back plate and flywheel and guiding the pressure plate for movement toward and away from the flywheel, one or more double coiled torsion springs of the grasshopper type arranged to cooperate with the interfitting projections of the back plate and pressure plate to urge the pressure plate normally toward the back plate away from the flywheel, the said springs each comprising a pair of coils having two pairs of arms radiating therefrom, the one pair of arms being interconnected by a cross-portion, the pressure plate having a recess provided on the inside of its rearward projection and receiving said cross-portion therein, the back plate having holes provided therein for reception of the free ends of the other arms, whereby to properly relate the spring to the interfitting projections of the pressure plate and back plate, respectively, and means for moving the pressure plate away from the back plate against the action of said spring means to engage the clutch.

11. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch, respectively, a plurality of cams mounted on the pressure plate facing the back plate, abutment means mounted on the back plate for adjustment relative to said cams, whereby to predetermine the movement of the pressure plate for a given operation of the cams, manually operable means for operating the cams to effect positive engagement of the clutch, all of said cams being round nosed and arranged to have sliding engagement with the abutment means, and means for limiting the turning of said cams so that the same are moved slightly over center when given extreme movement.

12. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch, respectively, a plurality of rock shafts of equal lengths supported on the back of the pressure plate for oscillatory movement and disposed the same distance from the axis of rotation and in such relation to one another as to maintain dynamic balance in said pressure plate, cams on said shafts disposed in substantially equally circumferentially spaced relation with respect to the clutch disc and flywheel whereby further to maintain dynamic balance in the pressure plate and also secure uniform engagement of the clutch, means for simultaneously rocking said shafts to like degrees whereby to correspondingly turn said cams, and an abutment ring threadedly mounted on the back plate for adjustment relative to said cams.

13. A clutch as set forth in claim 12 including means for limiting the rocking of said shafts when the cams thereof are in position for substantially full engagement of the clutch.

WILLIAM F. HUGHES.